March 3, 1931.   J. B. ARMITAGE ET AL   1,794,361
MILLING MACHINE SPINDLE AND TOOL
Filed March 25, 1927
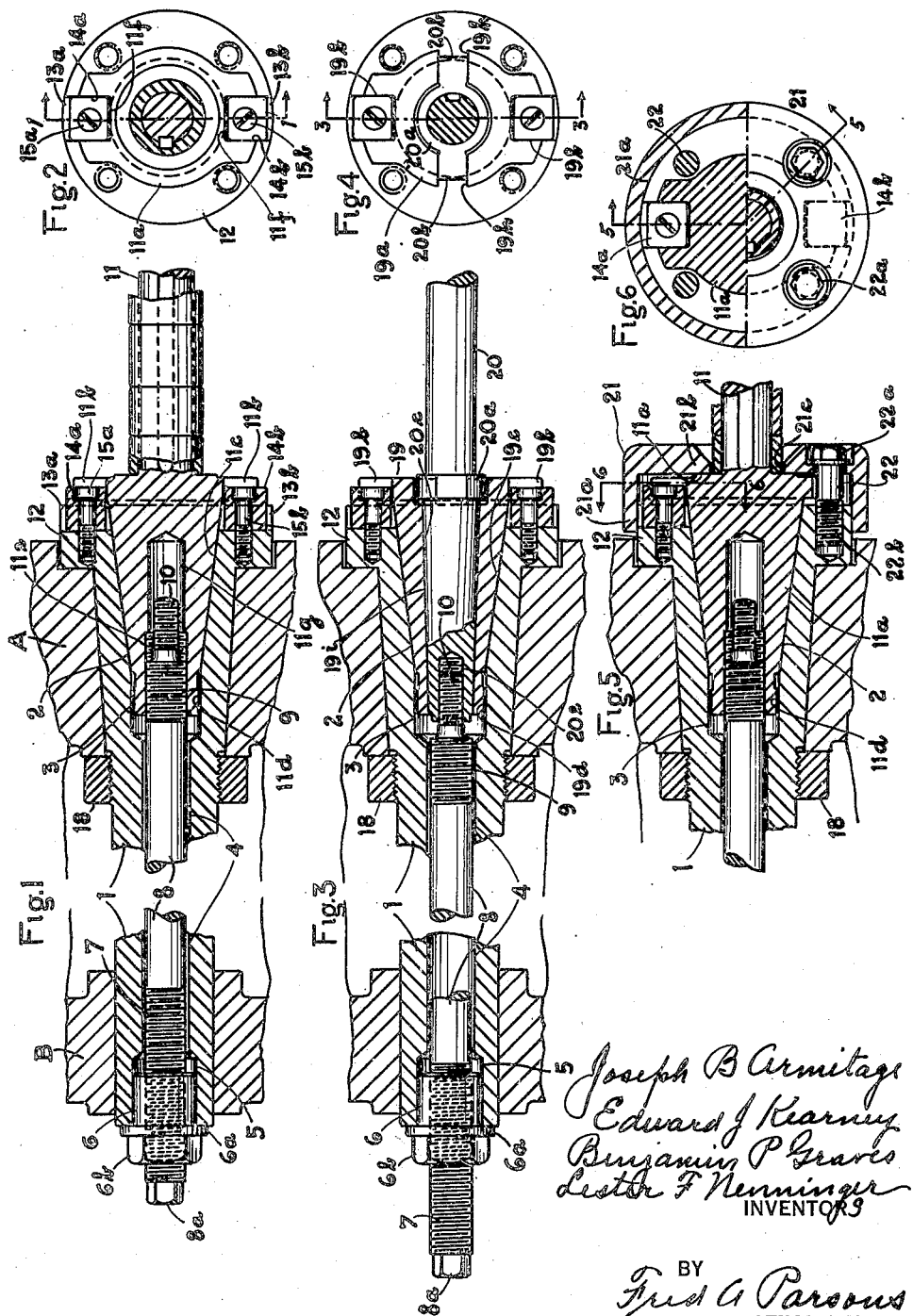
Joseph B Armitage
Edward J Kearney
Benjamin P Graves
Lester F Nenninger
INVENTORS
BY Fred G Parsons
ATTORNEY Patented Mar. 3, 1931

1,794,361

UNITED STATES PATENT OFFICE

JOSEPH B. ARMITAGE, OF MILWAUKEE, AND EDWARD J. KEARNEY, OF WAUWATOSA, WISCONSIN, AND BENJAMIN P. GRAVES, OF PROVIDENCE, RHODE ISLAND, AND LESTER F. NENNINGER, OF CINCINNATI, OHIO; SAID ARMITAGE AND SAID KEARNEY ASSIGNORS TO KEARNEY & TRECKER CORPORATION, OF WEST ALLIS, WISCONSIN, A CORPORATION OF WISCONSIN; SAID GRAVES ASSIGNOR TO BROWN & SHARPE MANUFACTURING COMPANY, OF PROVIDENCE, RHODE ISLAND, A CORPORATION OF RHODE ISLAND; AND SAID NENNINGER ASSIGNOR TO THE CINCINNATI MILLING MACHINE COMPANY, OF CINCINNATI, OHIO, A CORPORATION OF OHIO

MILLING-MACHINE SPINDLE AND TOOL

Application filed March 25, 1927. Serial No. 178,236.

This invention relates to improvements in means for aligning, retaining and driving arbors or other tools for milling machines.

The principal object of this invention is to provide improved means for rigidly and accurately coupling an arbor or other tool with the spindle of a milling machine in exact predetermined position and alignment for the purpose of transmitting rotation to the tool in either direction of rotation and for quick and convenient uncoupling of such parts.

Another object is to provide a tool coupling for milling machines which is easily applied and capable of accurately and rigidly aligning and driving an arbor or other tool, yet of a nature to be easily and quickly released and having no tendency for either the coupling or tool to stick or bind during release, whereby no hammering or heavy pressure is required for removing the tool, the improved construction thus tending to preserve the accuracy of the milling machine and considerably increasing the productive capacity by reducing the time required for change of tools.

Another object is to provide a milling machine tool and spindle having relatively steep tapered portions fitted together for mutual alignment, yet devised to prevent an overhanging tool, such as an arbor, from falling out of position, even in the absence of retaining or supporting means other than that afforded by the construction and form of the tool and spindle.

Another purpose relates to an improved form of milling machine spindle, another to an improved form of tool particularly adapted for a milling machine spindle, another to coupling means adapted for such spindle and such tool, and still other purposes may be understood from the description and claims.

The invention consists in the particular arrangement and combination of parts as herein illustrated, described and claimed and is to be understood to include such modified constructions as may be equivalent to the construction claimed.

In the accompanying drawings, the invention has been shown in a preferred form. The same characters have been used throughout for designating the same parts in each of the several views, of which:

Fig. 1 is an axial section through a horizontal milling machine spindle, tool and coupling embodying the invention, the section being taken along line 1—1 of Fig. 2. The tool shown is an arbor of which the projecting end is only partially shown, since such end may be of any preferred form.

Fig. 2 is an end view of the parts shown in Fig. 1.

Fig. 3 is an axial section through the same spindle but in this case coupled with a different form of arbor as will be explained. The section is taken along line 3—3 of Fig. 4.

Fig. 4 is an end view of parts shown in Fig. 3.

Fig. 5 is an axial section through the front end of the same spindle coupled with the same arbor as shown in Fig. 1 but in a different manner, illustrating the adaptability of the improved spindle and tool as will be described. The section is taken along line 5—5 of Fig. 6.

Fig. 6 is a front view of the assembly shown in Fig. 5 partly in section along line 6—6 of Fig. 5.

Referring to Figs. 1 and 2, the horizontal spindle 1 is journalled in bearings A and B and is retained against axial movement by the means of a thrust flange 12 and a thrust nut 18 which is adjustably threaded on the spindle and locked by any preferred means, not shown.

The spindle 1 is provided with a bore including a tapered bore portion 2, of relatively steep taper per unit of length, a cylindrical bore portion 3 adjacent the tapered bore, an axial bore portion 4 of relatively small diameter which extends through the spindle and an enlarged axial bore portion 5 at the rear end. A sleeve 6, fits rotatably into bore 5 and has a flange 6a limiting axial movement relative to the spindle, and a hexagon end 6b whereby the sleeve may be rotated by the means of a suitable wrench applied thereto. A threaded portion 7 of a rod 8 engages a threaded bore of sleeve 6. Rod 8 extends through bore 4 to the front spindle end and is there provided with a larger and a smaller threaded portion 9 and 10 respectively. The rear end of rod 8 is provided with a hexagon portion 8a to fit a suitable wrench for turning the rod.

The spindle end or nose is enlarged to provide a flange 12 having slots 13a and 13b into which are closely but removably fitted keys 14a and 14b, secured by screws 15a and 15b.

An arbor 11 has an enlarged flange portion 11a provided with slots 11b into which the keys 14a and 14b extend, and having a tapered shank portion 11c adapted to fit within the tapered bore 2 of the spindle and having a cylindrical shank portion 11d closely fitted in the cylindrical bore 3 of the spindle but not contacting the bore 3 when the arbor is in position. The cylindrical portion is preferably of such diameter that its surface cylinder stands outside the surface cone of the tapered portion. The rear end of arbor 11 is provided with a threaded bore or socket 11e engaging with the threaded end 9 of the rod 8, such bore being extended in depth at 11g to provide a clearance for the smaller threaded portion 10 of rod 8.

It may be noted that the relatively steep taper per unit of length herein referred to in connection with the tapered bore or socket and shank, is primarily for the purpose of preventing sticking or binding of the tool when the tool is to be removed, yet it is preferable that the taper should not be too steep, for in such case the diameter at the outer end becomes too large for a milling machine spindle before sufficient axial length is obtained to insure that the arbor will be brought into exact axial alignment with the spindle when the shank is firmly seated in the tapered spindle bore, and in any case too steep a taper is not desirable for accurate alignment. Tools constructed with a taper of three and one-half inches per foot of length have been found to answer all the desired conditions for milling machines although somewhat less or more angle might also be used. The preferred taper may be stated as complementary to the lateral surface of a frustum of a right circular cone of which the altitude is less than four times and more than three times the base diameter. Tapers previously commonly employed vary somewhat but are generally on the order of one-half inch, up to three quarters of an inch per foot.

Although the taper necessary to prevent sticking may vary, as explained above, it has been found that any taper which will not stick will not of itself safely hold an overhanging tool in position in a horizontal milling machine spindle while the retaining means, such as rod 8 is being adjusted to attach or remove the tool. Milling machine construction is such that the operator must go to the back of the machine to adjust rod 8 and therefore cannot hold the tool in position but if the tool falls out damage may result to the machine, the tool or the work, or injury to the operator. Means are therefore provided to prevent the tool from falling out of the spindle as will now be described in connection with the operation of attaching and removing the arbor 11.

The rod 8 together with sleeve 6 may be moved back, after which the arbor end is inserted into the tapered bore of the spindle, and set back until the complementary tapered portions seat together, the arbor being positioned for the slots 11b to engage with keys 14a and 14b. Because of the steep taper of the shank, if the operator now released his hold on the arbor to go to the back of the milling machine for inserting and adjusting the rod 8, the arbor will immediately start to slide down the inclined surface. Such sliding motion is however arrested almost as soon as it starts because the keys 14b strike one of the key slot surfaces as soon as a certain amount of such movement has taken place and the surfaces over which the arbor must then move, will not permit further sliding. As soon as the key strikes the slot surfaces the overhanging weight of the arbor causes the arbor to bind in such position and it will remain there while the operator adjusts the draw row. The keys need not be, and preferably are not, closely fitted to the slots for even with considerable freedom, the desired action will take place. Preferably the keys should be fitted, as shown in the drawings, both at the sides and bottom since if fitted only at the sides, the arbor might still fall in certain positions of spindle rotation, for instance when the keys were in the same vertical line. While the complementary keys and slots are sufficient to prevent the arbor from falling, the cylindrical shank portion 11d and its complementary bore provide still greater safety against such undesired result. When the arbor is in axial alignment with the spindle the cylindrical shank portion does not touch the bore within which it stands thereby making it unnecessary that the cylindrical portion be absolutely concentric with the tapered portion. It is however sufficiently closely fitted and is of sufficient length in the spindle bore that immediately the overhanging weight of the arbor pulls the arbor out of alignment, the cylindrical shank portion binds in its complementary bore. The operator may therefore safely leave the arbor and go to the back of the machine to insert the rod 8 in the arbor shank. The parts are then in the position approximately as shown in Fig. 1 but the rod has not yet been tightened. To tighten the rod and thereby firmly draw the arbor to its seat, suitable wrenches are applied to the hexagon portions 6b and 8a whereby the rod 8 may be prevented from turning while the sleeve 6 is turned. The arbor is now firmly coupled with the spindle, the complementary tapered portions serving to insure accurate axial alignment while the complementary keys and slots serve to drive the arbor from the spindle in either direction of rotation and the rod 8 retains the arbor firmly seated in such position.

For releasing the arbor, suitable wrenches are applied to the hexagon portions 8a and 6b to release the tension on rod 8, after which the rod may be readily unscrewed, and during such operation the complementary keys and slots and the straight arbor portion 11d in the straight bore 3 prevents the arbor from falling out of the relatively steep tapered spindle bore, as previously described even when the rod is entirely unscrewed, and because of such relatively steep tapered bore the arbor may then be removed without forcing or hammering.

The use illustrated in Figs. 1 and 2 is best adapted for conditions where the arbor or tool itself may be provided with a portion directly fitted to the spindle 1, but in many instances this is not convenient, and Figs. 3 and 4 illustrate the use of the device for driving an arbor or other tool having a suitable shank, through an intermediate member or adapter 19. The adapter 19 is provided with a flange portion 19a, having slots 19b fitted over the keys 14a and 14b in the same manner as the slots of the previously described arbor 11, and having a shank portion 19c fitted to the tapered spindle bore 2, and having a straight shank portion 19d fitted to the straight spindle bore portion 3 in the same manner as for the corresponding portion 11d of arbor 11. An arbor 20 is provided with a relatively small flange 20a in this instance partially socketed in a suitable recess in the adapter 19, and having lugs or keys 20b extending from its periphery and closely but removably fitted in complementary slots 19h in the flange 19a. Arbor 20 has a shank portion 20c of relatively slight taper per unit of length fitted in a complementary bore 19i of the adapter and provided at the rear end with a threaded bore 20e, of relatively small size to fit the small threaded end 10 of rod 8. The threaded portion 7 of rod 8 is of sufficient length to permit the rod to be set back for its small end to engage with the threaded bore 20e while still maintaining a threaded engagement with the sleeve 6, as shown in Fig. 3.

Owing to the relatively small taper of shank 20c the engagement of the arbor 20 and adapter 10 is semi-permanent, that is to say, the adapter will release itself freely from its spindle engagement and remain fixed on the arbor 20 unless disengaged by the use of considerable force, but this is not objectionable since no damage thereby results to the spindle or machine nor is the machine operation delayed, for the arbor and adapter are at such time not in position in the spindle. The arbor 20 with the adapter in place is coupled and uncoupled from the milling machine spindle in substantially the same manner as previously described for the arbor 11 with the one exception as noted above, that the rod is adjusted to engage its smaller threaded end directly with the tool instead of with the adapter, and provides substantially the same advantages for engagement and disengagement of the arbor with the spindle, and for aligning and driving the arbor, and to prevent the arbor from falling out of the relatively steep tapered spindle bore.

The rod 8 is ordinarily sufficient to set up the required end pressure to press the taper tool shank into the spindle bore, but there is also contemplated additional means as is illustrated in Figs. 5 and 6 and although the additional means is applicable to a variety of tools, the previously described arbor 11 is shown in connection with such additional means for reasons of convenience. The spindle flange 12 is accurately finished on its periphery and closely but slidably fitted thereon is a hollow cylindrical portion 21a of a cap or cup shaped member 21, having a wall or end portion 21b provided with a bore 21c providing clearance for the arbor 11 to project there through. When in position on the spindle the rear face of the wall portion 21b abuts against the front face of the flange 11a of the arbor, and the cap may be forced rearwardly to force the arbor solidly and rigidly into the tapered spindle bore, by the means of bolts 22 having heads 22a providing hexagon portions adapted to be engaged by a suitable wrench and having threaded shanks 22b engaging with suitable threaded bores in the spindle flange 12. The threaded bores in flange 12 are suitably spaced in relation to the keys 14a and 14b for the bolts 22a to avoid such keys, and in a manner to permit the arbor flange 11a to be cut away to permit the bolts to pass while still leaving sufficient flange material to engage with and be driven from the keys as particularly illustrated in the upper portion of Fig. 6. The cap 21 shown in Figs. 5 and 6 is also sometimes used without using the rod 8 and it is then not necessary for the operator to go to the back of the machine to adjust rod 8 which may in such case be removed entirely. It may be noted that the use illustrated in Figs. 5 and 6 retains all the advantages of arbor and spindle construction previously described.

Many or all of the advantages of the construction particularly described in relation to the use of an arbor, are equally advantageous for other tools such as milling cutters, etc. having shanks similar to arbor 11 or arbor 20, and it is to be understood that such advantages are desired to be protected by this application equally for arbors or other tools, if within the scope of the claims.

Having now fully described the invention, what is claimed is:

1. In a milling machine the combination of a rotatable spindle having a flange portion adjacent one end thereof and having an axial bore including a tapered portion adjacent said flange and complementary to the lateral surface of a frustum of a right circular cone of an altitude less than four and more than three times its base diameter, and including a cylindrical bore portion adjacent said tapered portion, a tool having a tapered shank portion complementary to said tapered bore portion and fitting said tapered bore portion over an axial length sufficient for the engaged tapered portions to completely align said tool therewith, the contact of said tool with said spindle for effecting tool alignment being limited to portions tapered as described, a flange portion fixed with said shank portion in a position to stand adjacent said spindle flange when said tool is positioned for said shank to be seated in said tapered bore, said tool having another shank portion positioned within said cylindrical bore when the tool is in the position described, a plurality of keys fixed with one of said flanges respectively on opposite sides of the axis thereof, the other flange being provided with slots adapted to receive said keys, and retaining means adapted to force said tapered shank portion into said tapered bore portion.

2. In a milling machine, the combination of a spindle member having an axial bore including a tapered portion adjacent one end of said spindle and complementary to the lateral surface of a frustum of a right circular cone of an altitude less than four and more than three times its base diameter and including a cylindrical portion adjacent said tapered portion, a tool member having a tapered shank portion seated in said tapered bore portion and fitted therewith for an axial distance sufficient for the engaged tapered portions to completely align said tool member and having another shank portion positioned in said cylindrical bore portion whereby the contact of said tool and spindle for effecting tool alignment is limited to portions tapered as described, a plurality of keys fixed with one of said members and respectively on opposite sides of the bore, the other of said members having slots adapted to receive said keys and means for forcing said tapered shank portion into said tapered bore portion and rigidly retaining the parts in such position.

3. A milling machine structure including a hollow spindle having an elongated axial tapered socket formed with a taper complementary to the lateral surface of a frustum of a right circular cone of an altitude less than four and more than three times its base, said socket being of an axial length sufficient to align a tool received therein, and a tool for cooperation therewith having a tapered portion normally seated in the tapered socket to determine an exact relative position of said spindle and tool, said spindle and tool having other surfaces normally disengaged when said tool is seated but adapted for mutual opposition to determine an approximate relative position therebetween when the tapered portion is loosened in its socket, the tool aligning contact of said tool and spindle being limited to portions tapered as described.

4. An arbor for use with a milling machine, comprising a shank portion for socketing in the spindle of said machine and having a tapered surface of a length sufficient to completely align said arbor and complementary to the lateral surface of a frustum of a right circular cone of an altitude less than four and more than three times its base diameter, said tapered portion being of an axial length substantially greater than its greatest diameter, means adjacent the larger end of said shank portion and engageable for driving said arbor from the spindle of said machine, and means engageable for seating said shank portion in a suitable socket in the spindle of said machine and rigidly retaining said shank therein.

5. A draw-bar structure for use in conjunction with a hollow socketed milling machine spindle, including a main bar portion having a threaded outer end, and an abutment adjustably engaged on the threaded outer end for varying the effective length of the bar, said bar having a threaded portion at the opposite end terminating in a reduced threaded tang; whereby said portion or tang may be selectively engaged with differing sizes of arbor ends and the adjustment of the abutment will compensate for the ensuing variance in effective length.

JOSEPH B. ARMITAGE.
EDWARD J. KEARNEY.
BENJAMIN P. GRAVES.
L. F. NENNINGER.